Nov. 16, 1926.
E. C. HALL
1,607,075
ELECTROLYTIC RECTIFIER
Filed June 7, 1923
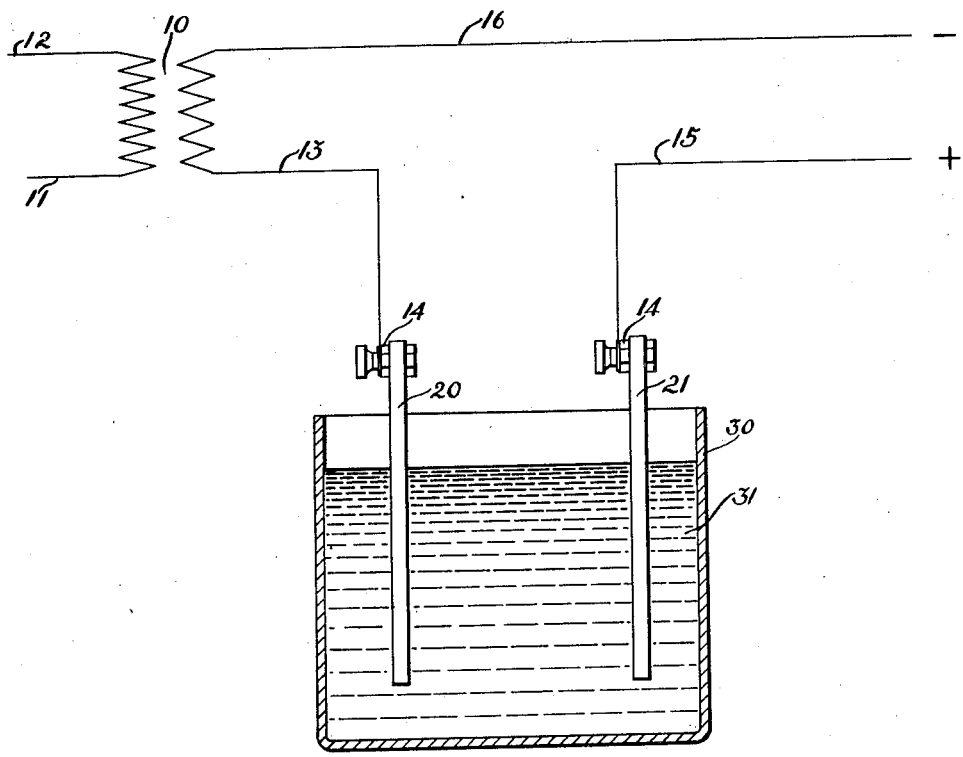
Inventor
Earl C. Hall
by *Ha.Patterson*
Atty Patented Nov. 16, 1926.

1,607,075

UNITED STATES PATENT OFFICE.

EARL C. HALL, OF CHICAGO, ILLINOIS, ASSIGNOR TO WESTERN ELECTRIC COMPANY, INCORPORATED, OF NEW YORK, N. Y., A CORPORATION OF NEW YORK.

ELECTROLYTIC RECTIFIER.

Application filed June 7, 1923. Serial No. 643,868.

This invention relates to rectifiers and more particularly to electrolytic rectifiers.

Since it is sometimes desirable to operate rectifiers continuously for long periods of time, it is necessary that they be so designed as to function properly throughout such period. Due to the fact that a considerable amount of the energy supplied to a rectifier is converted into heat, it is desirable to provide a rectifier which will function properly through a considerable range of temperatures.

An object of the present invention is to improve and cheapen a rectifier of the electrolytic type.

Another object of the invention is to enlarge the range of temperatures within which the rectifier will effectively function and thereby increase the activity of the rectifier.

In order to attain these objects there is provided in one embodiment of the invention an electrolyte preferably of one part of pure water and one part of sulphuric acid having a specific gravity of 1.84, in which are placed electrodes of zinc and iron.

These and other features of the invention not specifically mentioned will clearly appear from the following description and the accompanying drawing, the figure of which shows in schematic form a rectifier in accordance with one embodiment of the invention and an associated circuit in which it may be used.

Referring in detail to the drawing, a tank 30 which may be of earthenware or other suitable material, contains an electrolyte 31, which preferably consists of equal parts of pure water and sulphuric acid having a specific gravity of 1.84. However, satisfactory results may be obtained by using a more concentrated electrolyte. An electrode 21 composed of zinc, and another electrode 20, which may be of iron, are maintained in contact with the electrolyte by any suitable supporting means (not shown). Each of the electrodes is provided with a binding post 14 of any suitable nature for attaching thereto the conductors of the circuit in which the rectifier is to be included.

As shown in the drawing, conductors 11 and 12 may extend to any suitable source of alternating current and connect such source to the primary winding of a transformer 10. One terminal of the secondary winding of the transformer 10 is connected by the conductor 13 to the electrode 20, while the other terminal of such winding may extend to any suitable work circuit (not shown), in which it is desired to employ direct current. This work circuit is also connected by a conductor 15 with the electrode 21. When connected in this manner the alternating current present in the primary winding of the transformer 10 is induced into the secondary winding and the voltage of such current is reduced to a value suitable for use with the work circuit. This alternating current of reduced voltage traverses the circuit, including the rectifier, and in accordance with the usual and well known phenomena of electrolytic rectifiers, is translated into pulsating direct current.

By the use of the zinc electrode in an electrolyte of this character it has been found that the rectifier may be used for a considerable period of time, although a substantial amount of heat is generated. In one particular instance a rectifier constructed in accordance with this invention was operated at temperatures varying from 22° C. to 110° C. and effectively functioned throughout this wide range of temperatures.

Not only is a zinc electrode considerably cheaper than the chemically pure aluminum electrode which has been sometimes used in electrolytic rectifiers in the past, but the electrolyte used is also less expensive than the ammonium phosphate electrolyte usually employed in connection with the aluminum electrode type of rectifier.

What is claimed is:

1. An electrolytic rectifier, comprising an electrolyte of sulphuric acid, a zinc electrode, and an iron electrode.

2. An electrolytic rectifier, comprising an electrolyte of equal parts of pure water and sulphuric acid having a specific gravity of 1.84, a zinc electrode, and an iron electrode.

In witness whereof, I hereunto subscribe my name this 25th day of May A. D., 1923.

EARL C. HALL.